US012681184B2

(12) United States Patent
Wang et al.

(10) Patent No.: US 12,681,184 B2
(45) Date of Patent: Jul. 14, 2026

(54) METHOD FOR PLACE RE-RECOGNITION OF MOBILE ROBOT BASED ON LIDAR ESTIMABLE POSE

(71) Applicant: ZHEJIANG UNIVERSITY, Zhejiang (CN)

(72) Inventors: Yue Wang, Zhejiang (CN); Xuecheng Xu, Zhejiang (CN); Sha Lu, Zhejiang (CN); Rong Xiong, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 26 days.

(21) Appl. No.: 19/002,590

(22) Filed: Dec. 26, 2024

(65) Prior Publication Data

US 2025/0123398 A1 Apr. 17, 2025

Related U.S. Application Data

(63) Continuation of application No. PCT/CN2022/105502, filed on Jul. 13, 2022.

(51) Int. Cl.
*G01S 17/89* (2020.01)
*G06T 7/73* (2017.01)

(52) U.S. Cl.
CPC ............... *G01S 17/89* (2013.01); *G06T 7/73* (2017.01); *G06T 2207/10028* (2013.01); *G06T 2207/20048* (2013.01)

(58) Field of Classification Search
CPC ........ G01S 17/89; G01S 7/4808; G01S 17/42; G01S 7/48; G06T 7/73; G06T 2207/10028; G06T 2207/20048
See application file for complete search history.

(56) References Cited

U.S. PATENT DOCUMENTS 6,002,807 A 12/1999 Guerci
9,840,003 B2 * 12/2017 Szatmary ............. G06V 10/145
(Continued)

FOREIGN PATENT DOCUMENTS

CN 113406659 9/2021
CN 113552585 10/2021
(Continued)

OTHER PUBLICATIONS

"International Search Report (Form PCT/ISA/210) of PCT/CN2022/105502", mailed on Apr. 12, 2023, with English translation thereof, pp. 1-4.
(Continued)

*Primary Examiner* — Russell Frejd
*Assistant Examiner* — Brittany Renee Peko
(74) *Attorney, Agent, or Firm* — JCIPRNET

(57) ABSTRACT

A method for place re-recognition of a mobile robot based on a lidar estimable pose, said method comprising: using radon transform to convert rotation and translation changes into translation changes on two axes of a sinusoidal graph, and, on the basis of an amplitude spectrum of a spectrum, performing spectrum cross-correlation calculation on translation invariance and two images, so as to solve the translation property of the images. Translation invariance is used to generate a position descriptor and thereby perform candidate matching for place re-recognition; and cross-correlation calculation may be performed together with radon transform to solve relative rotation and translation. In the described method, a time-varying environment is considered, and by using a multi-channel feature BEV for representation, the capability of representing a local feature in a laser point cloud can be improved.

10 Claims, 5 Drawing Sheets

(56) References Cited

U.S. PATENT DOCUMENTS 9,852,512 B2 * 12/2017 Gonzalez-Banos ....... G06T 7/73
2020/0306983 A1 * 10/2020 Noh ..................... G05D 1/0246

FOREIGN PATENT DOCUMENTS

CN      113866739       12/2021
KR      20210119133 A  * 10/2021   ............ B25J 9/1697

OTHER PUBLICATIONS

"Written Opinion of the International Searching Authority (Form
PCT/ISA/237) of PCT/CN2022/105502", mailed on Apr. 12, 2023,
pp. 1-3.
Xiaqing Ding et al., "Translation Invariant Global Estimation of
Heading Angle Using Sinogram of LiDAR Point Cloud", 2022
IEEE International Conference on Robotics and Automation (ICRA),
May 2022, pp. 2207-2214.

* cited by examiner

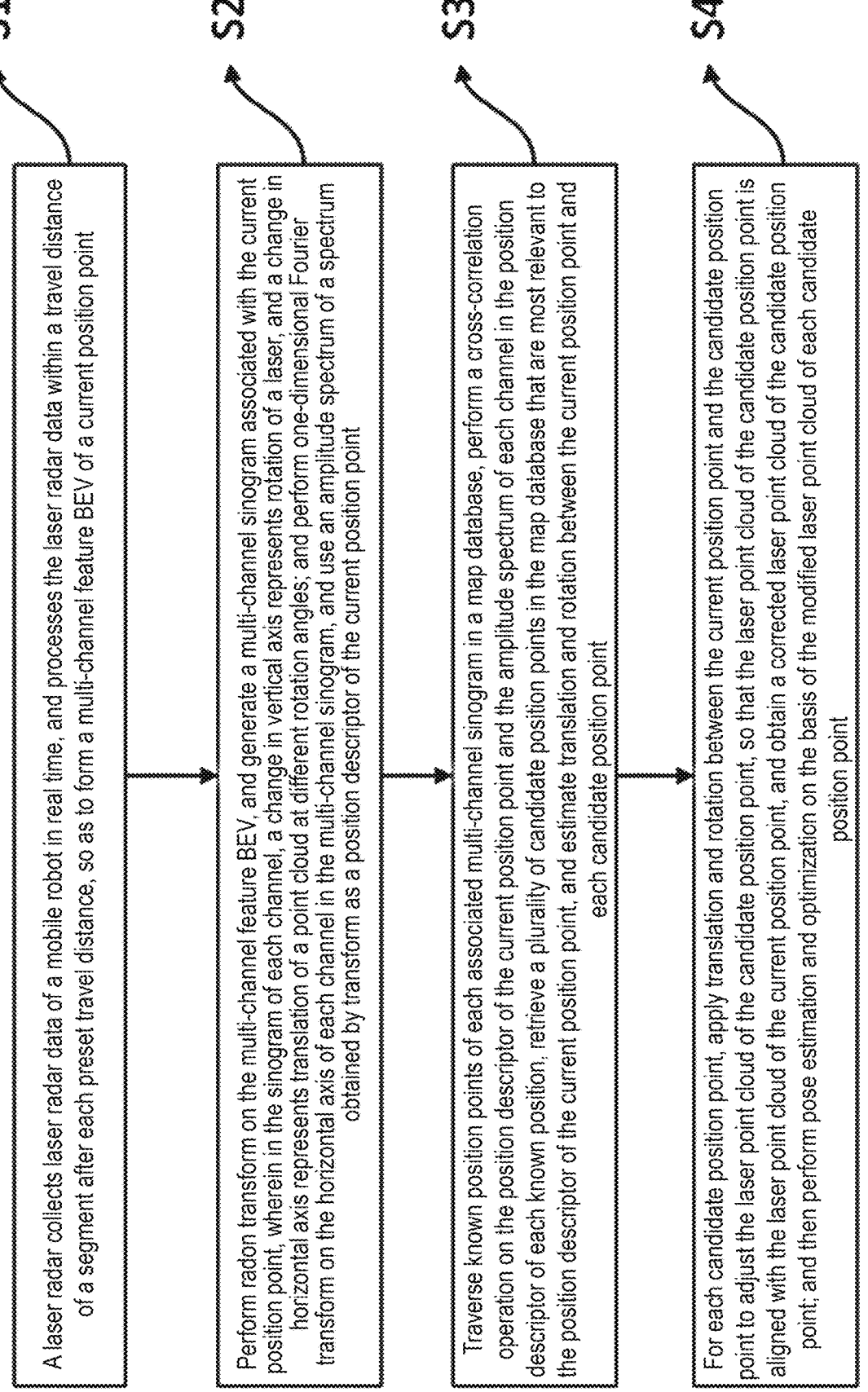

S1 — A laser radar collects laser radar data of a mobile robot in real time, and processes the laser radar data within a travel distance of a segment after each preset travel distance, so as to form a multi-channel feature BEV of a current position point

S2 — Perform radon transform on the multi-channel feature BEV, and generate a multi-channel sinogram associated with the current position point, wherein in the sinogram of each channel, a change in vertical axis represents rotation of a laser, and a change in horizontal axis represents translation of a point cloud at different rotation angles; and perform one-dimensional Fourier transform on the horizontal axis of each channel in the multi-channel sinogram, and use an amplitude spectrum of a spectrum obtained by transform as a position descriptor of the current position point

S3 — Traverse known position points of each associated multi-channel sinogram in a map database, perform a cross-correlation operation on the position descriptor of the current position point and the amplitude spectrum of each channel in the position descriptor of each known position, retrieve a plurality of candidate position points in the map database that are most relevant to the position descriptor of the current position point, and estimate translation and rotation between the current position point and each candidate position point

S4 — For each candidate position point, apply translation and rotation between the current position point and the candidate position point to adjust the laser point cloud of the candidate position point, so that the laser point cloud of the candidate position point is aligned with the laser point cloud of the current position point, and obtain a corrected laser point cloud of the candidate position point; and then perform pose estimation and optimization on the basis of the modified laser point cloud of each candidate position point

FIG. 1

Single-channel feature          Radon          Single-channel feature
BEV                            transform        sinogram

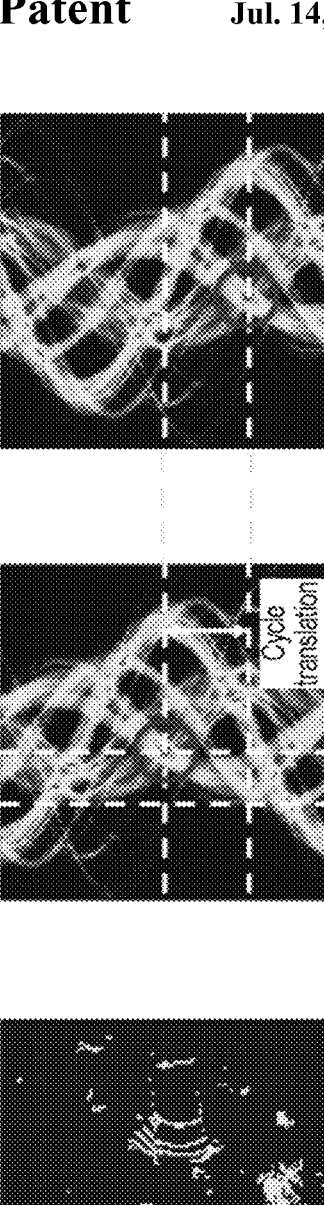
Sinogram after pure rotation
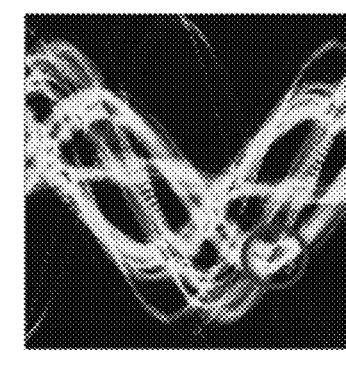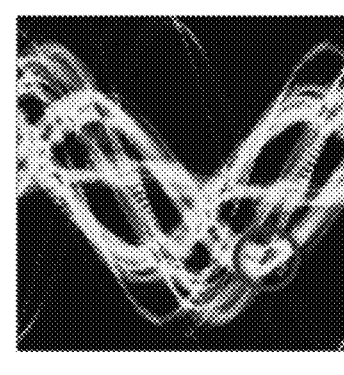
Sinogram after simultaneous rotation and translation
Single-channel sinogram
Cycle translation
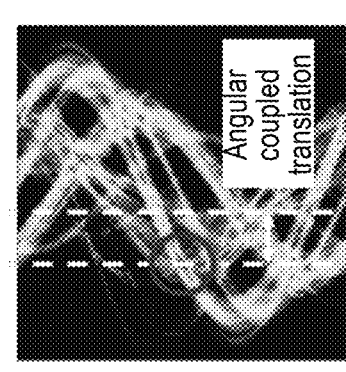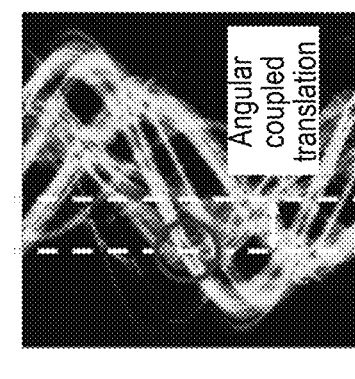
Angular coupled translation
Sinogram after translation
BEV after pure rotation
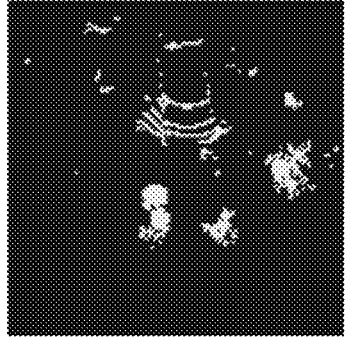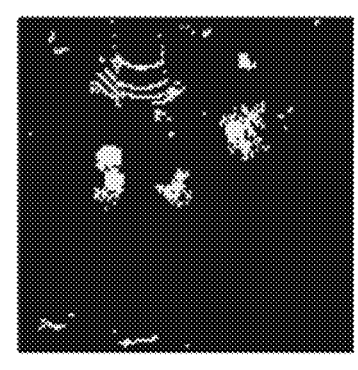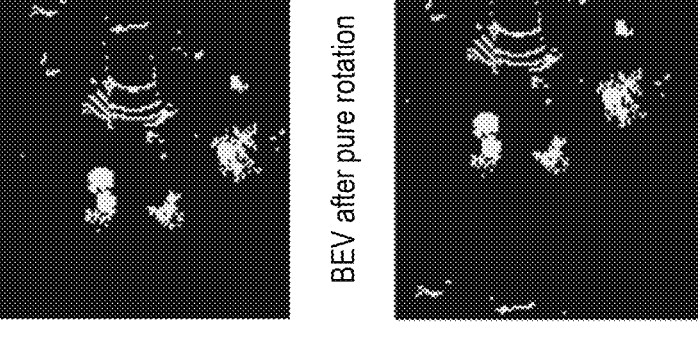
BEV after simultaneous rotation and translation
Single-channel feature BEV
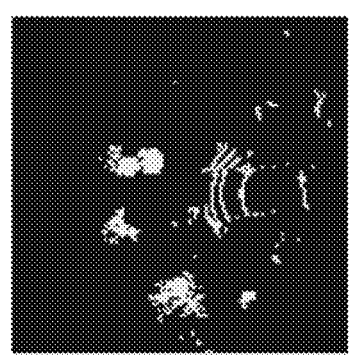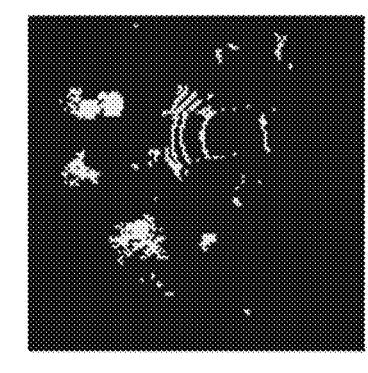
BEV after pure translation
FIG. 4

1D
FFT

Single-channel sinogram       Single-channel amplitude
value spectrum

METHOD FOR PLACE RE-RECOGNITION OF MOBILE ROBOT BASED ON LIDAR ESTIMABLE POSE

CROSS-REFERENCE TO RELATED APPLICATION

This application is a continuation of international application of PCT application serial no. PCT/CN2022/105502 filed on Jul. 13, 2022. The entirety of the above mentioned patent application is hereby incorporated by reference herein and made a part of this specification.

TECHNICAL FIELD

The disclosure relates to the field of mobile robot positioning, and in particular to a method for place re-recognition of a mobile robot based on a lidar estimable pose.

DESCRIPTION OF RELATED ART

Place re-recognition technology is a very important part of the global positioning of mobile robots, which can ensure that the map constructed by the robot is globally consistent. Global positioning estimates the current position of the robot without any prior information. A common approach is to divide global positioning into two parts, and the first part is place re-recognition. That is, the current robot observation is matched with the observation of the location the robot has traveled to obtain possible candidate locations for the robot. The second part is to perform pose estimation, that is, to conduct a more accurate pose estimation through the current observation and the candidate location observation, so as to calculate the current pose of the robot.

The continuous iteration of lidar hardware in recent years has promoted the development of laser-based location place re-recognition methods. The methods of this type do not rely on images collected by cameras, so they are robust to changes in the environment and are not easily affected by changes in lighting and seasonal changes in time. Although these methods can provide better results in some restricted scenarios at present, most of them do not take into account the ultimate goal of global positioning, which is to give the pose of the robot. Most of the methods only consider giving candidate locations, but after the candidate locations are given, errors may occur when further estimating the pose based on the two frame point clouds. This is because commonly used point cloud pose estimation methods have higher requirements for initial values. Although the place re-recognition module gives the location in complex situations, poor initial values may lead to errors in subsequent pose estimation, resulting in errors in the positioning results.

SUMMARY

The disclosure aims to solve the problems found in the related art and provides a method for place re-recognition of a mobile robot based on a lidar estimable pose that can take into account pose estimation, so as to achieve global positioning that is robust to environmental changes. It is worth explaining that, "laser radar" is also referred to "lidar" within the context of this invention.

To achieve the above, the technical solutions specifically adopted by the disclosure are as follows:

A method for place re-recognition of a mobile robot based on a lidar estimable pose includes the following steps:

In S1, a laser radar collects laser radar data of the mobile robot in real time, the laser radar data is processed within a travel distance of a segment after each preset travel distance, and a multi-channel feature BEV (Bird's-eye-view) of a current position point is formed.

In S2, radon transform is performed on the multi-channel feature BEV channel by channel, a multi-channel sinogram associated with the current position point is generated, in a sinogram of each channel, a change in a vertical axis represents rotation of a laser and a change in a horizontal axis represents translation of a point cloud at different rotation angles, one-dimensional Fourier transform is performed on the horizontal axis of each channel in the multi-channel sinogram, and an amplitude value spectrum of a spectrum of each channel obtained by transform is used as a position descriptor of the current position point.

In S3, each known position point of each associated multi-channel sinogram in a map database is traversed, a cross-correlation operation is performed on the position descriptor of the current position point and the amplitude value spectrum of each channel in a position descriptor of each known position point, a plurality of candidate position points in the map database that are most relevant to the position descriptor of the current position point are retrieved, and translation and rotation between the current position point and each candidate position point is estimated and obtained.

In S4, for each candidate position point, translation and rotation between the current position point and the candidate position point is applied to adjust a laser point cloud of the candidate position point, so that the laser point cloud of the candidate position point is aligned with a laser point cloud of the current position point and a corrected laser point cloud of the candidate position point is obtained, and pose estimation and optimization is performed on the basis of the corrected laser point cloud of each candidate position point.

Compared with the related art, the advantages of the disclosure are:

1. The method for place re-recognition of the mobile robot provided by the disclosure does not rely on images collected by cameras, so this method is robust to changes in the environment and is not easily affected by changes in lighting and seasonal changes in time.
2. Consistent effects can be achieved under different sparse sampling conditions in the disclosure, and map storage can be reduced.
3. The pose can be estimated simultaneously in the disclosure, so the accuracy of global positioning is significantly improved.
4. The disclosure does not rely on deep learning and can be used in different scenarios without changing the configuration.

BRIEF DESCRIPTION OF THE DRAWINGS

FIG. 1 is a flow chart of a method for place re-recognition of a mobile robot based on an estimable pose of lidar information.

FIG. 4 is a schematic view of translation and rotation characteristics of a feature sinogram according to an embodiment of the disclosure.

DESCRIPTION OF THE EMBODIMENTS

Figure 2:
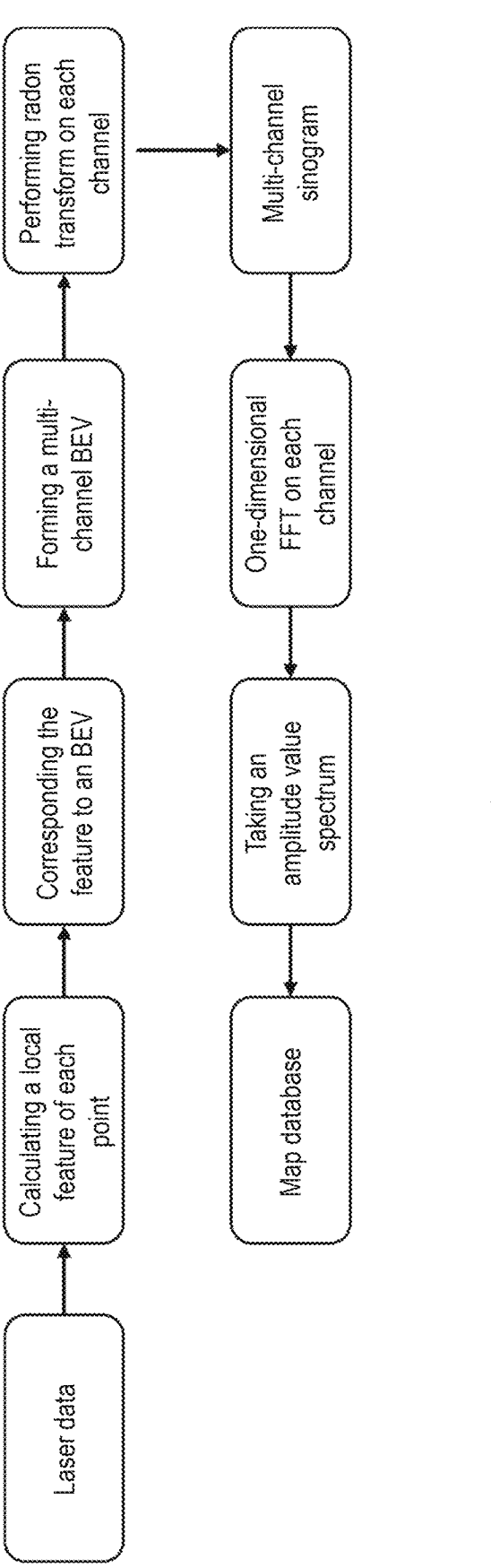
FIG. 2 is a flow chart for obtaining an amplitude value spectrum in an embodiment of the disclosure.

In order to make the above objects, features and advantages of the disclosure more clearly understood, the specific embodiments of the disclosure will be described in detail below with reference to the accompanying drawings. In the following description, numerous specific details are set forth in order to provide a thorough understanding of the disclosure. However, the disclosure can be implemented in many other ways than those described herein, and a person having ordinary skill in the art can make similar modifications without departing from the meaning of the disclosure. Accordingly, the disclosure is not limited by the specific examples disclosed below. The technical features in the various embodiments of the disclosure may be combined accordingly as long as they do not conflict with each other.

In a preferred embodiment of the disclosure, a method for place re-recognition of a mobile robot based on a lidar estimable pose is provided, and the method includes the following steps:

In S1, a laser radar collects laser radar data of the mobile robot in real time, the laser radar data is processed within a travel distance of a segment after each preset travel distance, and a multi-channel feature BEV of a current position point is formed.

It should be noted that the collection of the laser radar data of the mobile robot through laser radar data is related art, so description thereof is not provided herein. During a traveling process, the mobile robot may determine its own travel distance based on odometer information. The laser radar data within this travel distance of the segment may be processed into the multi-channel feature BEV of the current position point after each preset travel distance. The specific distance value set may be adjusted according to actual conditions, and shall generally be <100 m. As a preferred implementation of the embodiments of the disclosure, it can be configured to process the laser radar data to form the multi-channel feature BEV every 20 m of traveling based on the odometer information of the mobile robot.

As a preferred implementation of the embodiments of the disclosure, in the above step S1, the specific sub-steps of processing the laser radar data to form the multi-channel feature BEV of the current position point are as follows:

In S11, every point in the laser radar data is traversed, a plurality of feature values of a local point cloud centered on a current traversal point is calculated, multi-channel features of the current traversal point are formed, and each feature is normalized.

It should be noted that the multi-channel features of each point in the laser radar data are obtained by calculating the feature values of its local point cloud, and each feature value acts as a channel feature. The specific feature value types selected in the multi-channel features may be selected according to actual conditions and may include some or all features of trace, linearity, planarity, sphericity, curvature change, feature entropy, anisotropy, and total variance. Preferably, all of these 8 features may be used. In addition, in the local point cloud of a point, the specific number of points $k$ may be adjusted according to the actual situation, and it is preferable to use $k=20$ to 40 points closest to the point to construct the local point cloud, and further preferably $k=30$ points.

A point cloud size of the laser radar data is usually large, and the calculation on the CPU takes a long time. Therefore, as a preferred implementation of the embodiments of the disclosure, GPU may be used to perform feature calculation on each laser point cloud in parallel, and calculation efficiency may be improved and real-time performance may be achieved in this way.

In S12, according to plane coordinates of each point in the laser radar data, the corresponding multi-channel features are stored into corresponding grid points of an BEV grid, and if there are multiple points projected into the same grid point, only a maximum value in each channel feature is stored.

It should be noted that the BEV grid is a plane grid in an BEV state, each cell in the grid is regarded as a grid point, and xy plane coordinates in a map may correspond to one grid point. A set of multi-channel features is stored in each grid point, so when the xy coordinates of multiple points are the same, they are stored in the same grid point. For each channel feature herein, the maximum value of the channel feature among all points needs to be taken, the maximum value is then stored in the grid point, and the channel features of the remaining points are directly discarded.

In S13, the BEV grid is divided into channels. A pixel value in each channel image is a corresponding channel feature value, so that the multi-channel feature BEV is formed.

After the calculation in step S1, a rotation change of the mobile robot at the same location appears as a vertical translation change in the multi-channel feature BEV. The translation near the same location appears as horizontal translation.

In S2, radon transform is performed on the multi-channel feature BEV channel by channel, a multi-channel sinogram associated with the current position point is generated, in a sinogram of each channel, a change in a vertical axis reflects rotation of a laser and a change in a horizontal axis represents translation of a point cloud at different rotation angles, one-dimensional Fourier transform is performed on the horizontal axis of each channel in the multi-channel sinogram, and an amplitude value spectrum of a spectrum of each channel obtained by transform is used as a position descriptor of the current position point.

Therefore, as a preferred implementation of the embodiments of the disclosure, the specific implementation sub-steps of the above step S2 are as follows:

In S21, radon transform is performed on each channel of the multi-channel feature BEV of the current position point to generate the multi-channel sinogram of the current position point.

In S22, each channel image of the multi-channel sinogram is converted into a frequency domain representation through one-dimensional fast Fourier transform performed on the horizontal axis, an amplitude spectrum of the spectrum obtained through transform is used as the position descriptor of the current position point.

Figure 3:
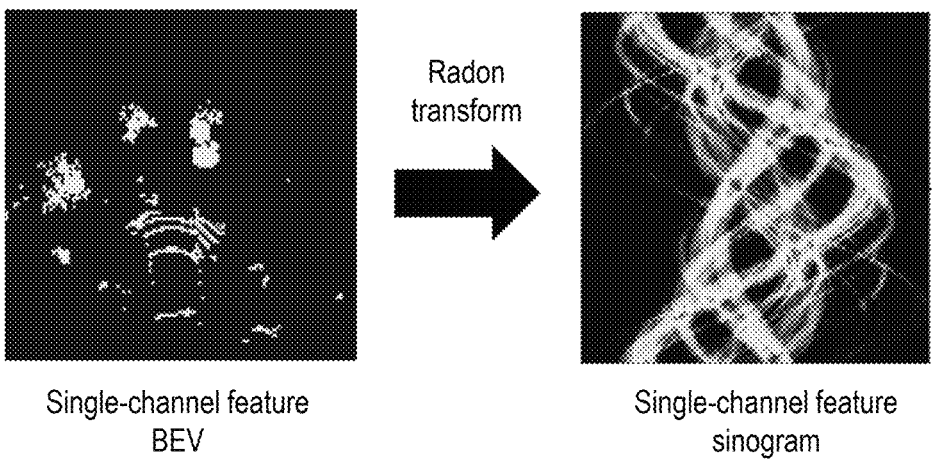
FIG. 3 is a schematic view of transform from a feature BEV into a sinogram according to an embodiment of the disclosure.
Figure 5:
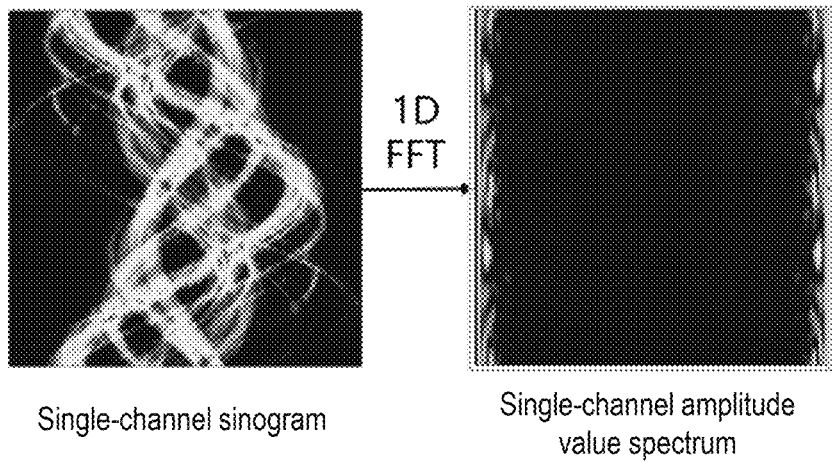
FIG. 5 is a schematic view of transform from the sinogram into an amplitude value spectrum according to an embodiment of the disclosure.

It should be noted that the amplitude spectrum is the amplitude value spectrum. In an exemplary embodiment, as shown in FIG. 2, the channel feature BEV is obtained first according to S1, radon transform is performed on the multi-channel feature BEV layer by layer, and the sinogram of one channel in the generated multi-channel sinogram representation is shown in FIG. 3. For the sinogram of each channel, the change in the vertical axis reflects the rotation of the laser, and the horizontal axis represents the translation of the point cloud at different rotation angles. This property is shown in FIG. 4. After the multi-channel sinogram is obtained, one-dimensional Fourier transform is performed on the horizontal axis of each channel. The amplitude value spectrum of the obtained spectrum is used as the position descriptor, and the amplitude value spectrum is shown in FIG. 5.

Due to the characteristics of fast Fourier transform, the horizontal translation in the multi-channel sinogram is not reflected in the amplitude spectrum of the spectrum, so the obtained position descriptor has translation invariance. That is, the descriptors near the same location are consistent, and the translation and rotation between locations may be estimated based on this feature.

In S3, each known position point of each associated multi-channel sinogram in a map database is traversed, a cross-correlation operation is performed on the position descriptor of the current position point and the amplitude value spectrum of each channel in a position descriptor of each known position point, a plurality of candidate position points in the map database that are most relevant to the position descriptor of the current position point are retrieved, and translation and rotation between the current position point and each candidate position point is estimated and obtained.

As a preferred implementation of the embodiments of the disclosure, the specific implementation sub-steps of the above step S3 are as follows:

In S31, for the associated multi-channel sinogram of each known position point in the map database, one-dimensional fast Fourier transform is performed on the horizontal axis of each channel for conversion into frequency domain representation, and the amplitude value spectrum of the spectrum of each channel is obtained and used as the position descriptor of the known position point. Cross-correlation calculation is then performed channel by channel on the amplitude value spectrum of the current position point and the amplitude value spectrum of each known position point, and multi-channel correlation spectra are added to obtain a final single-channel correlation spectrum. After each of the current position point and each known position point obtains a single-channel correlation spectrum, a maximum correlation value in each single-channel correlation spectrum is found, several known position points with the largest maximum correlation values are selected as candidate locations, and a vertical coordinate of the maximum correlation value in the single-channel correlation spectrum of each candidate location is used as relative rotation between the candidate location and the current position point.

It should be noted that in the correlation spectrum, a horizontal coordinate represents a sampling frequency in the Fourier transform, the vertical coordinate represents the relative rotation, and the value of each point in the correlation spectrum represents the correlation of the relative rotation at one sampling frequency.

It should be noted that the map database is a database used to store a digital map required by the mobile robot. When the map database is constructed, the mobile robot can explore within a map region, and at different position points, the multi-channel sinogram corresponding to the position point may be calculated and associated according to the processes described in S1 and S2. The map database is built step by step, and as the mobile robot continues to explore the region through laser scanning, the position points throughout the region are continuously associated with their own multi-channel sinograms. The position points that have been laser scanned and associated with the multi-channel sinogram are called the known position points in the disclosure.

It should be noted that the number K of candidate locations selected each time needs to be adjusted based on actual conditions. The maximum correlation value in one single-channel correlation spectrum may be obtained for all known position points in the map database, and these maximum correlation values are arranged in a descending order, and the known position points corresponding to the top K maximum correlation values are selected as K candidate locations.

In S32, for each candidate location, the relative rotation between the candidate location and the current position point is compensated onto the multi-channel sinogram corresponding to the candidate location, so that there is only translation transform but no rotation transform between the current position point and the multi-channel sinogram of the candidate location. That is, there are only changes in the horizontal translation on the sinogram of each channel.

In S33, for each candidate location, an one-dimensional cross-correlation operation is performed on pixel rows in the multi-channel sinogram compensated for the relative rotation, a coupled translation amount between two pixel rows coupled by horizontal and vertical translation amounts is calculated, and each row on the multi-channel sinogram is formed into a linear equation in two variables according to the principle of radon transform. Further, two independent variables in the linear equation in two variables are the horizontal translation amount and the vertical translation amount between the current position point and each candidate position point, and a dependent variable is the coupled translation amount.

It should be noted that the coupled translation amount of the multi-channel sinogram may be obtained through a one-dimensional cross-correlation operation, which is coupled by horizontal and vertical translation amounts of a true position. Each row on the sinogram may form one linear equation in two variables containing the horizontal and vertical translation amounts of the true position, and the specific form of this linear equation in two variables may be determined based on the principle of radon transform. In the embodiments of the disclosure, the form of the above linear equation in two variables may be expressed as follows:

$$x\cos(\theta_i) + y\sin(\theta_i) = \tau_i,$$

in the equation, $\theta_i$ represents a rotation angle corresponding to the radon transform of a similar pixel in an $i^{th}$ row, x and y are respectively the horizontal translation amount and the vertical translation amount between the current position point to be calculated and each candidate position point, and $\tau_i$ is the coupled translation amount between the two rows of pixels in the $i^{th}$ row obtained by the one-dimensional cross-correlation operation.

Since each row of the multi-channel sinogram may establish one linear equation in two variables, all linear equations in two variables of the entire multi-channel sinogram form an overdetermined equation. By solving the overdetermined equation using a singular value decomposition (SVD) method, the horizontal translation amount and the vertical translation amount of the point cloud between the current position point and each candidate position point may be obtained.

In S4, for each candidate position point, translation and rotation between the current position point and the candidate position point is applied to adjust a laser point cloud of the candidate position point, so that the laser point cloud of the candidate position point is aligned with a laser point cloud of the current position point and a corrected laser point cloud of the candidate position point is obtained, and pose estimation and optimization is then performed on the basis of the corrected laser point cloud of each candidate position point.

After the corrected laser point cloud of the candidate position point is obtained, a current position of the mobile robot may be estimated and optimized according to any feasible pose estimation and optimization method in the related art.

As a preferred implementation of the embodiments of the disclosure, in the step S4, when the pose estimation and optimization is performed on the basis of the corrected laser point cloud of each candidate position point, an iterative closest point (ICP) algorithm is used to precisely estimate the pose on the basis of the corrected laser point cloud of each candidate position point first, it is then determined whether convergence occurs, and an estimation result is used for subsequent pose optimization if convergence occurs. In an embodiment, the method used in the pose optimization herein may be g2o graph optimization.

It should be noted that when precise pose estimation is performed, if the pose estimation results converge, data is associated between the current position and the candidate position in the map to provide help for subsequent pose optimization. However, if the pose estimation results do not converge, it means that the current position of the mobile robot is not in the map, so the pose estimation and optimization of the current position point may be skipped first, but the multi-channel sinogram of the position point may still be associated with and stored in the map database.

As a preferred implementation of the embodiments of the disclosure, during the traveling process of the mobile robot, after the above S1 to S4 are completed, the multi-channel sinogram generated corresponding to each position point may be stored in the map database in real time for next candidate location retrieval and relative pose estimation and optimization. In this way, the number of known position points in the map database may gradually increase, and the optimization performance of candidate location retrieval and relative pose estimation may be gradually improved.

In view of the above, the method includes: using radon transform to convert rotation and translation changes into translation changes on two axes of a sinogram, and, on the basis of an amplitude spectrum of a spectrum, performing spectrum cross-correlation calculation on translation invariance and two images, so as to solve a translation property of the images. Translation invariance is used to generate a position descriptor and thereby perform candidate matching for place re-recognition; and cross-correlation calculation may be performed together with radon transform to solve relative rotation and translation. A time-varying environment is considered, and by using a multi-channel feature BEV for representation, the capability of representing a local feature in a laser point cloud can be improved.

The above-described embodiments are only preferred solutions of the disclosure, but the embodiments are not intended to limit the disclosure. A person having ordinary skill in the art can also make various changes and modifications without departing from the spirit and scope of the disclosure. Therefore, any technical solutions obtained by equivalent substitution or equivalent transformation fall within the protection scope of the disclosure.

What is claimed is:

1. A method for place re-recognition of a mobile robot based on a lidar estimable pose, comprising the following steps:

S1: collecting laser radar data of the mobile robot in real time through a laser radar, processing the laser radar data within a travel distance of a segment after each preset travel distance, and forming a multi-channel feature BEV of a current position point;

S2: performing radon transform on the multi-channel feature BEV channel by channel, generating a multi-channel sinogram associated with the current position point, and in a sinogram of each channel, a change in a vertical axis represents rotation of a laser and a change in a horizontal axis represents translation of a point cloud at different rotation angles; performing one-dimensional Fourier transform on the horizontal axis of each channel in the multi-channel sinogram, and using an amplitude value spectrum of a spectrum of each channel obtained by transform as a position descriptor of the current position point;

S3: traversing each known position point of each associated multi-channel sinogram in a map database, performing a cross-correlation operation on the position descriptor of the current position point and the amplitude value spectrum of each channel in the position descriptor of each known position point, retrieving a plurality of candidate position points in the map database that are most relevant to the position descriptor of the current position point, and estimating and obtaining translation and rotation between the current position point and each candidate position point; and S4: for each candidate position point, applying translation and rotation between the current position point and the candidate position point to adjust a laser point cloud of the candidate position point, so that the laser point cloud of the candidate position point is aligned with a laser point cloud of the current position point and a corrected laser point cloud of the candidate position point is obtained; performing pose estimation and optimization on the basis of the corrected laser point cloud of each candidate position point.

2. The method for place re-recognition of the mobile robot based on the lidar estimable pose according to claim 1, wherein the mobile robot determines its own travel distance based on odometer information.

3. The method for place re-recognition of the mobile robot based on the lidar estimable pose according to claim 1, wherein in the step S1, the specific steps of processing the laser radar data and forming the multi-channel feature BEV of the current position point are as follows:

S11: traversing every point in the laser radar data, calculating a plurality of feature values of a local point cloud centered on a current traversal point, forming multi-channel features of the current traversal point, and normalizing each feature;

S12: according to plane coordinates of each point in the laser radar data, storing the corresponding multi-channel features into corresponding grid points of an BEV grid, and if there are multiple points projected into the same grid point, storing only a maximum value in each channel feature; and S13: dividing the BEV grid into channels, a pixel value in each channel image is a corresponding channel feature value, so that the multi-channel feature BEV is formed.

4. The method for place re-recognition of the mobile robot based on the lidar estimable pose according to claim 1, wherein the multi-channel features comprise some or all features of trace, linearity, planarity, sphericity, curvature change, feature entropy, anisotropy, and total variance.

5. The method for place re-recognition of the mobile robot based on the lidar estimable pose according to claim 1, wherein specific implementation steps of the step S2 comprise the following:

S21: performing radon transform on each channel of the multi-channel feature BEV of the current position point to generate the multi-channel sinogram of the current position point; and S22: converting each channel image of the multi-channel sinogram into a frequency domain representation through one-dimensional fast Fourier transform performed on the horizontal axis and using an amplitude spectrum of the spectrum obtained through transform as the position descriptor of the current position point.

6. The method for place re-recognition of the mobile robot based on the lidar estimable pose according to claim 1, wherein specific implementation steps of the step S3 comprise the following:

S31: for the associated multi-channel sinogram of each known position point in the map database, performing one-dimensional fast Fourier transform on the horizontal axis of each channel for conversion into frequency domain representation, obtaining and using the amplitude value spectrum of the spectrum of each channel as the position descriptor of the known position point; then performing cross-correlation calculation channel by channel on the amplitude value spectrum of the current position point and the amplitude value spectrum of each known position point, adding multi-channel correlation spectra to obtain a final single-channel correlation spectrum; after each of the current position point and each known position point obtains a single-channel correlation spectrum, finding a maximum correlation value in each single-channel correlation spectrum, selecting several known position points with the largest maximum correlation values as candidate locations, and using a vertical coordinate of the maximum correlation value in the single-channel correlation spectrum of each candidate location as relative rotation between the candidate location and the current position point;

S32: for each candidate location, compensating the relative rotation between the candidate location and the current position point onto the multi-channel sinogram corresponding to the candidate location, so that there is only translation transform but no rotation transform between the current position point and the multi-channel sinogram of the candidate location; and S33: for each candidate location, performing an one-dimensional cross-correlation operation on pixel rows in the multi-channel sinogram compensated for the relative rotation, calculating a coupled translation amount between two pixel rows coupled by horizontal and vertical translation amounts, forming each row on the multi-channel sinusoidal sinogram into a linear equation in two variables according to the principle of radon transform, wherein two independent variables in the linear equation in two variables are a horizontal translation amount and a vertical translation amount between the current position point and each candidate position point, a dependent variable is the coupled translation amount; all linear equations in two variables of the entire multi-channel sinogram form an overdetermined equation, and the horizontal translation amount and the vertical translation amount of the point cloud between the current position point and each candidate position point are obtained through a singular value decomposition method.

7. The method for place re-recognition of the mobile robot based on the lidar estimable pose according to claim 1, wherein a form of the linear equation in two variables is:

$$x\cos(\theta_i) + y\sin(\theta_i) = \tau_i,$$

in the equation, $\theta_i$ represents a rotation angle corresponding to the radon transform of a similar pixel in an $i^{th}$ row, x and y are respectively the horizontal translation amount and the vertical translation amount between the current position point to be found and each candidate position point, and $\tau_i$ is the coupled translation amount between the two rows of pixels in the $i^{th}$ row obtained by the one-dimensional cross-correlation operation.

8. The method for place re-recognition of the mobile robot based on the lidar estimable pose according to claim 1, wherein in the step S4, when the pose estimation and optimization is performed on the basis of the corrected laser point cloud of each candidate position point, an iterative closest point algorithm is used to estimate the pose on the basis of the corrected laser point cloud of each candidate position point first, it is then determined whether convergence occurs, and an estimation result is used for subsequent pose optimization if the convergence occurs.

9. The method for place re-recognition of the mobile robot based on the lidar estimable pose according to claim 8, wherein the method used in the pose optimization is g2o graph optimization.

10. The method for place re-recognition of the mobile robot based on the lidar estimable pose according to claim 1, wherein during a traveling process of the mobile robot, the multi-channel sinogram generated corresponding to each position point is stored in the map database in real time for next candidate location retrieval and relative pose estimation.

* * * * *